(12) United States Patent
Kwon et al.

(10) Patent No.: US 9,584,212 B2
(45) Date of Patent: *Feb. 28, 2017

(54) COMMUNICATION METHOD FOR SOURCE DEVICE, DESTINATION DEVICE AND RELAY DEVICE

(71) Applicant: ELECTRONICS AND TELECOMMUNICATIONS RESEARCH INSTITUTE, Daejeon (KR)

(72) Inventors: Hyoung Jin Kwon, Daejeon (KR); Yong Sun Kim, Daejeon (KR); Sung Geun Jin, Daejeon (KR); Kap Seok Chang, Daejeon (KR); Seung Eun Hong, Daejeon (KR); Woo Yong Lee, Daejeon (KR); Hyun Kyu Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 50 days.

This patent is subject to a terminal disclaimer.

(21) Appl. No.: 14/550,365

(22) Filed: Nov. 21, 2014

(65) Prior Publication Data
US 2015/0078193 A1    Mar. 19, 2015

Related U.S. Application Data

(63) Continuation of application No. 13/577,121, filed as application No. PCT/KR2011/000757 on Feb. 7, 2011, now Pat. No. 8,908,550.

(30) Foreign Application Priority Data

Feb. 5, 2010  (KR) .................. 10-2010-0011214
Mar. 11, 2010  (KR) .................. 10-2010-0021933
(Continued)

(51) Int. Cl.
*H04B 7/155* (2006.01)
*H04L 12/707* (2013.01)
(Continued)

(52) U.S. Cl.
CPC .......... *H04B 7/15557* (2013.01); *H04L 5/14* (2013.01); *H04L 45/22* (2013.01); *H04W 24/08* (2013.01);
(Continued)

(58) Field of Classification Search
None
See application file for complete search history.

(56) References Cited

U.S. PATENT DOCUMENTS

| | | | |
|---|---|---|---|
| 6,081,510 | A | 6/2000 | Valentine |
| 2008/0064327 | A1 | 3/2008 | Choi et al. |

(Continued)

FOREIGN PATENT DOCUMENTS

| | | |
|---|---|---|
| JP | 2006-067557 A | 3/2006 |
| JP | 2008-532346 A | 8/2008 |

(Continued)

OTHER PUBLICATIONS

Hyoungjin Kwon et al., "Anti-blocking Mechanism by Relay", Project:IEEE P802.15 Working Group for Wireless Personal Area Networks (WPANs), IEEE 802.15/08/0522-00-003c, Jul. 2008.
(Continued)

*Primary Examiner* — Gary Mui
(74) *Attorney, Agent, or Firm* — Rabin & Berdo, P.C.

(57) ABSTRACT

A communication method of a source device according to an embodiment includes detecting a status of a first link directly connected from the source device to a destination device or a status of a second link connected from the source device to the destination device via a relay device, selecting any one of the first link and the second link based on a result of the detection, and transmitting data using the selected link.

19 Claims, 6 Drawing Sheets (30) Foreign Application Priority Data

May 10, 2010 (KR) .................. 10-2010-0043306
Feb. 1, 2011 (KR) .................. 10-2011-0010136

(51) Int. Cl.
*H04L 5/14* (2006.01)
*H04W 24/08* (2009.01)
*H04W 24/00* (2009.01)
*H04W 72/02* (2009.01)
*H04W 84/04* (2009.01)

(52) U.S. Cl.
CPC .......... *H04B 7/1555* (2013.01); *H04W 24/00* (2013.01); *H04W 72/02* (2013.01); *H04W 84/047* (2013.01)

(56) References Cited

U.S. PATENT DOCUMENTS

| | | | |
|---|---|---|---|
| 2008/0112368 A1 | 5/2008 | Kwon | |
| 2008/0112369 A1 | 5/2008 | Kwon | |
| 2008/0112370 A1 | 5/2008 | Kwon | |
| 2009/0185492 A1* | 7/2009 | Senarath | ............... H04B 7/155 370/238 |
| 2010/0278036 A1 | 11/2010 | Dai et al. | |
| 2011/0117907 A1* | 5/2011 | Hooli | ................... H04W 72/02 455/422.1 |
| 2012/0127855 A1 | 5/2012 | Alon et al. | |
| 2012/0300692 A1 | 11/2012 | Sfar et al. | |

FOREIGN PATENT DOCUMENTS

| | | |
|---|---|---|
| JP | 2009-164868 A | 7/2009 |
| KR | 10-0385040 B1 | 5/2003 |
| KR | 10-2008-0023031 A | 3/2008 |
| KR | 10-2008-0109617 A | 12/2008 |
| KR | 10-0878538 B1 | 1/2009 |
| KR | 10-2009-0048159 A | 5/2009 |
| KR | 10-2009-0122133 A | 11/2009 |
| WO | WO-2008/015330 A2 | 2/2008 |
| WO | WO-2008/107984 A1 | 9/2008 |
| WO | WO-2008/153308 A1 | 12/2008 |
| WO | WO-2009/069870 A1 | 6/2009 |
| WO | WO-2009/072815 A2 | 6/2009 |
| WO | WO-2009/072825 A2 | 6/2009 |

OTHER PUBLICATIONS

Hyoungjin Kwon et al., "Anti-blocking Mechanism by PNC", Project: IEEE P802.15 Working Group for Wireless Personal Area Networks (WPANs), IEEE 802.15-08-0339-0l-003c, May 2008.
Min Suk Kang et al., "Effect of Cooperative and Selection Relying Schemes on Multiuser Diversity in downlink cellular Systems with Relays", Journal of Communications and Networks, vol. 10, No. 2, Jun. 2008.
Troy Beukema et al, "An MSK system for Mobile Multi-Gb/s at 60GHz, concept, application and implementation", Project: IEEE P802.15 Working Group for Wireless Personal Area Networks (WPANs), Sep. 2006.
Abu-Surra Shadi "Relay operation in IEEE 802.11 ad" IEEE 802.11-10/0494r0, IEEE mentor, May 1, 2010.

* cited by examiner

COMMUNICATION METHOD FOR SOURCE DEVICE, DESTINATION DEVICE AND RELAY DEVICE

CROSS-REFERENCE TO THE RELATED APPLICATIONS

This is a continuation of application Ser. No. 13/577,121, filed Oct. 22, 2012, which is, in turn, a national stage of application number PCT/KR2011/000757, filed Feb. 7, 2011. Furthermore, this application claims also the benefit of priority of Korean applications number 10-2010-0011214, filed Feb. 5, 2010, Korean application number 10-2010-0021933, filed Mar. 11, 2010, Korean application number 10-2010-0043306, filed May 10, 2010, and Korean application 10-2011-0010136, filed Feb. 1, 2011. The disclosures of these prior applications are incorporated herein by reference.

TECHNICAL FIELD

The present invention relates to a communication method of a source device, a destination device, and a relay device in a wireless system.

BACKGROUND ART

A recently standardized millimeter wave, such as a band of 60 GHz, easily transmits data at rates of gigabits per second (Gbps), using about 2 GHz broadband communication devices without high modulation, but has a strong tendency to travel in a straight line and involves substantial power loss due to characteristics a high frequency wave. Thus, there is a method of using a directional antenna to collect power not in all directions but in a particular direction in order to obtain a high antenna gain.

However, when a line of sight (LOS) is not secured, a signal is transmitted via reflection, and accordingly a distance becomes longer, increasing a free space path loss and adding a loss due to the reflection. Moreover, a penetration loss is more than 20 dB when the LOS is blocked by a person, and a loss due to indoor walls or doors may be greater, so that signals may not be transmitted. Further, in a 60 GHz communication network, a range is limited to less than 10 meters, because an attenuation according to a distance becomes greater in a farther distance despite no a reflection or penetration loss. Thus, there is a high possibility that signals are not transmitted.

A wireless local area network (WLAN) used at home with a distance of more than 10 meters and having a band of less than 5 GHz has a range of tens of meters, and thus a single network covers the distance. However, a 60 GHz communication network does not cover the distance, causing inconvenience to users. Furthermore, since it is difficult to form a single network in rooms or a room and a living room where the LOS is blocked by doors or walls, described above, there is a need for a compensation method.

Thus, communication methods based on directional communication proper to the above band, such as WLAN or wireless personal area network (WPAN), are considered. However, when network conditions are dynamically changed, for example, when the LOS is blocked by a person during transmission of data, a LOS communication is impossible, so a bypass link is used. In this instance, there is a demand for synchronization of a transmitter with a receiver.

Further, the receiver may need to adjust a reception direction of a signal prior to the transmitter in order not to miss signals transmitted by the transmitter through a bypass link, and there is a need for a relay method used in a reserved period regardless of a transmission scheme through the bypass link.

DISCLOSURE OF INVENTION

Technical Goals

An aspect of the present invention provides a communication method of a source device, a destination device, and a relay device, wherein the communication method includes a link switch method of bypassing the relay device even if signals are not transmitted to a terminal to communicate with, when MAC access is performed using a directional antenna and enables use of a reserved period in a unified mode after a link switch regardless of a data transmission method.

Technical Solutions

According to an aspect of the present invention, there is provided a communication method of a source device including detecting a status of a first link directly connected from the source device to a destination device or a status of a second link connected from the source device to the destination device via a relay device, selecting any one of the first link and the second link based on a result of the detection, and transmitting data using the selected link.

According to an aspect of the present invention, there is provided a communication method of a destination device including determining whether a link selected by a source device among a first link directly connected from the source device to a destination device and a second link connected from the source device to the destination device via a relay device is available, and receiving data based on a result of the determination.

According to an aspect of the present invention, there is provided a communication method of a relay device including standing by for receipt of data from a source device at a start point of a preset link change interval when the source device selects a second link among a first link directly connected from the source device to a destination device and the second link connected from the source device to the destination device via a relay device, and transmitting the data to the destination device.

Effect of Invention

According to an aspect of the present invention, data may be smoothly transmitted by switching to a bypass link via a relay device when a line of sight (LOS) is blocked by an obstacle, and data may be transmitted in a unified manner regardless of whether the relay device uses a full duplex (FD) mode or a half duplex (HD) mode.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

In the following description, a source device, a destination device, and a relay device include any communication module which has a directional antenna and is capable of operating as a source, a destination, and a relay in a communication network, any base station, and any device which is capable of performing similar operations. The source device, the destination device, and the relay device are supposed to use a reservation-based medium access control (MAC). Further, data to be mentioned below includes a data frame, a data packet, or the like.

In a wireless local area network (WLAN) and a wireless personal area network (WPAN), there are provided data transmission methods in a contention scheme and in a contention free scheme. An access point (AP) of the WLAN or a pico net coordinator (PNC) of the WPAN divides a time block into a contention period and a contention free period.

In the contention period, all devices in the network compete based on carrier sense multiple access with collision avoidance (CSMA/CA) to acquire a channel.

In the contention free period, the AP or the PNC allows a device to exclusively use a particular time block of the contention free period for data transmission using a polling scheme or a method of transmitting scheduling information.

In an embodiment, switching a link transmitting data, that is, a method of switching the link, when the link in use to transmit data is blocked in the contention free period, and a method of properly relaying and transmitting data in a relay mode of a relay device when the switched link is via the relay device, are described.

Hereinafter, the method of switching the link and the method of properly relaying and transmitting data in the relay mode are based on IEEE 802.11 WLAN.

First, it is supposed that initialization processes, such as link setting and beam forming between a relay device, a source device, and a destination device, are already performed, and the devices are transmitting data or prepare for transmission of data in a block reserved by a coordinator.

In the initialization processes, a relay use mode is determined, wherein a first field of the relay use mode represents a normal/alternation mode, and a second field represents an amplify-and-forward (AF) relay device using a full duplex (FD) relay mode and a decode-and-forward (DF) relay device using a half duplex (HD) relay mode.

The DF relay device using the HD relay mode operates not in an alternation mode but only in a normal mode.

In the normal mode, the source device and the destination device exchange frames using the same one link among a direct link or a relay link as long as the link is not blocked or becomes unavailable due to severe deterioration of a channel.

In the alternation mode, frames are exchanged, alternately using the two links at preset intervals, that is, link change intervals.

The source device determines a mode to be used for data transmission among the normal mode and the alternation mode and informs the relay device and the destination device of the mode, and the mode is maintained unless the source device changes the mode.

Figure 1:
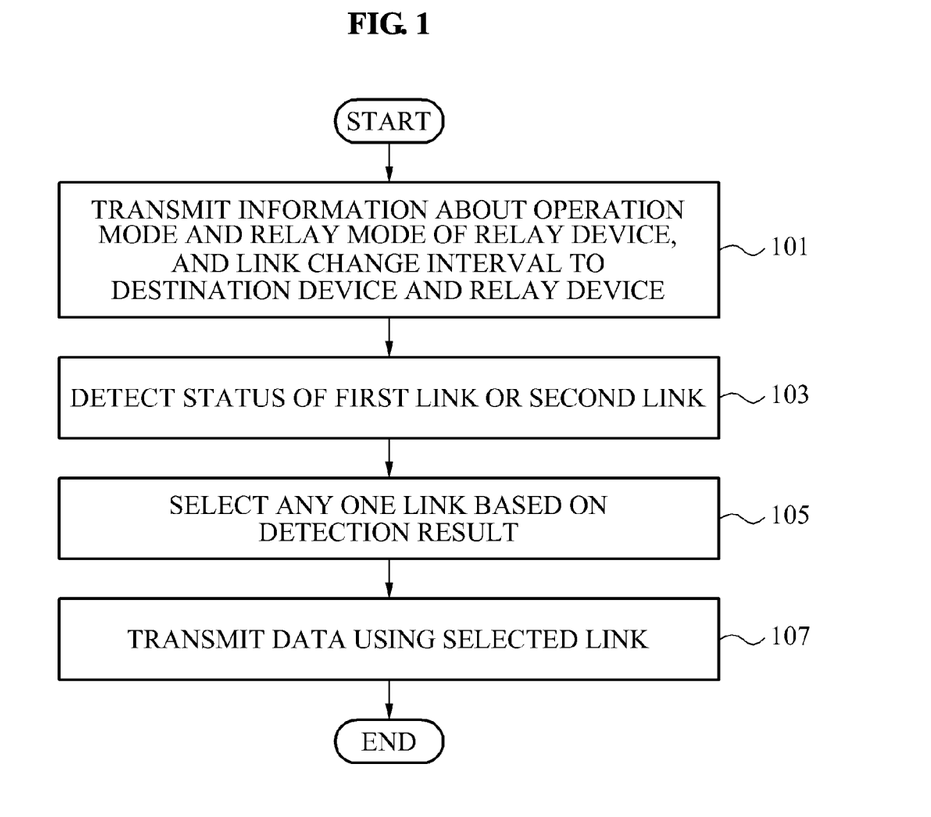
FIG. 1 is a flowchart illustrating a communication method of a source device according to an embodiment.

FIG. 1 is a flowchart illustrating a communication method of a source device according to an embodiment.

FIG. 1 illustrates a method of the source device switching a link transmitting data when the link in use to transmit data is blocked in the contention free period.

The source device informs a destination device and a relay device of parameters including a preset link change interval or data sensing time for the destination device to detect whether data is transmitted through a selected link.

Further, the source device transmits, to the destination device and the relay device, information about an operation mode and a relay mode of the relay device used to transmit data in operation 101.

Here, the selected link may be any one of a first link directly connected from the source device to the destination device and a second link connected from the source device to the destination device via the relay device. The relay mode of the relay device may include at least one of the FD mode and the HD mode.

In the FD mode, the relay device switches the first link to the second link in the link change interval preset by the source device and transmits data through the second link after the data sensing time.

The data sensing time is a period of time needed for the destination device to detect whether the data is transmitted through the selected link, that is, the first link.

In the HD mode, the relay device transmits data based on a first period for a relay link between the source device and the relay device and a second period for a relay link between the relay device and the destination device instead of the preset link change interval used in the FD mode.

The first period and the second period may be set or updated by the source device like the data sensing time.

When the HD mode is used, the source device may set or update the first period or the second period based on at least one of a beam forming result obtained before data is transmitted to the destination device and link quality information obtained while data is transmitted through the link.

The first period for the relay link between the source device and the relay device may start when the source device switches the first link to the second link.

Also, the preset link change interval may be restarted when the source device switches the second link to the first link.

The operation mode used by the source device to transmit data to the destination device and the relay device may include at least one of the normal mode and the alternation mode.

In the normal mode, data is transmitted to the destination device using any one link until any one of the first link and the second link is determined to be unavailable.

In the alternation mode, the source device transmits data to the destination device alternately using the first link and the second link at each start point of the preset link change interval.

Here, the second link may be formed between the source device and the relay device (S-R) and between the relay device and the destination device (R-D).

The source device detects a state of the first link directly connected from the source device to the destination device or a state of the second link connected from the source device to the destination device via the relay device in operation 103.

The source device selects any one of the first link and the second link based on a detection result in operation 105.

In operation 105, the source device may switch any one of the first link and the second link to the selected link based on the detection result in the preset link change interval.

Here, the source device may increase a transmission antenna gain of data through an unselected link by adjusting a direction of a directional antenna of the source device based on a beam forming result obtained in advance through the unselected link.

In operation 105, the source device may select any one of the first link and the second link based on an acknowledgement (ACK) signal with respect to previous data transmitted to the destination device through the selected link or link quality information obtained from a frame to estimate a state of a channel.

Here, the selection of any one link among the first link and the second link may be used, realizing whether the corresponding link is blocked or whether quality of the link corresponds to preset quality.

In selecting any one of the first link and the second link, when the first link or the second link is determined to be unavailable, the source device may switch the selected link to the unselected link in a next link change interval to a link change interval in which an instance that unavailability is identified occurs. Here, an unavailable link is not limited to a blocked link, and a link which is not blocked but has a lower quality than an available link may be expressed as an unavailable link.

The source device transmits data using the selected link in operation 107.

In operation 107, the source device may transmit the data using the selected link after time based on the data sensing time for the destination device to detect whether the data is transmitted through the selected link or switching time used for the destination device to switch the selected link to the unselected link.

When the source device determines to resume transmission of data in the alternation mode, the source device may transmit the data to the destination device after data sensing time of a next link change interval to the link change interval in order to inform the destination device that an operation through the selected link is resumed.

The source device may periodically switch to the unselected link in order to monitor quality of the unselected link among the first link and the second link.

When the source device switches the first link to the second link in order to monitor the quality of the unselected link, the source device may transmit, to the relay device, a request frame to monitor quality of the first link. The source device may receive a response frame including information about the quality of the first link from the relay device in response to the request frame.

Further, when the source device switches the second link to the first link to monitor the quality of the unselected link, the source device may transmit, to the relay device, a request frame to monitor quality of the link between the source and the relay device among the second links.

Then, the source device may receive, in response to the request frame, a response frame including information about the quality of the link between the source device and the relay device among the second links and information about quality of the link between the relay device and the destination device, received by the relay device from the destination device.

The source device may transmit and receive a request frame to monitor the quality of the second links and a response frame corresponding to the request frame to and from the destination device.

In an embodiment below, operations of the source device on the assumption that the source device transmits data using the first link are described. The source device may determine whether the first link in use to transmit data to the destination device is blocked.

Here, the source device may determine whether the first link currently in use is blocked based on preset protocols used in transmission of data to the destination device.

Here, the preset protocols may include a time instance used for the source device to transmit data to the destination device, whether the source device receives an ACK signal transmitted by a counterpart device which receives data transmitted by the source device.

When the first link is determined to be blocked, the source device may switch the first link currently in use to the second link based on the preset link change interval. When the first link is determined to be blocked, the source device may the first link to the second link in a next link change interval to the preset link change interval which is a link change interval in which an instance of blockage occurs.

Then, the source device transmits the data using the second link.

Here, the source device may transmit the data using the second link after time based on data sensing time and switching time.

The switching time is time used for the destination device to switch the first link to the second link.

When the first link is determined not to be blocked, the source device may transmit the data to the destination device using the same first link without a link switch.

Further, the source device may transmit a request frame to the relay device connected to the second link in order to identify whether the data received by the relay device is successfully transmitted to the destination device.

Here, the request frame may be a relay ACK request frame illustrated in the following Table 1.

When the relay device uses the HD relay mode, the source device transmits data based on the first period and the second period instead of the link change interval.

However, since ACK of the second period is transmitted by the relay device to the destination device, the relay device is aware of a status of the R-D link, whereas the source device cannot be aware of a status of the R-D link.

Thus, the source device may transmit the relay ACK request frame of the following Table 1 to the relay device in a next first period to request information about whether the frame is properly transmitted through the R-D link.

TABLE 1

| (Relay ACK Request) | |
|---|---|
| Order | Information |
| 1 | Category |
| 2 | Action |

TABLE 1-continued (Relay ACK Request)

| Order | Information |
|---|---|
| 3 | BAR Control |
| 4 | BlockAck starting Sequence Control |

The relay ACK request frame is a frame that the source device forwards to the relay device participating in a relay operation to identify whether all frames transmitted to the relay device are successfully transmitted to the destination device.

Further, the source device may receive, from the relay device in response to the request frame, a response frame indicating whether data is transmitted to the destination device.

Here, the response frame may be a relay ACK response frame.

The relay device responses to the relay ACK request frame with a relay ACK response frame illustrated in the following Table 2.

TABLE 2

(Relay ACK Response)

| Order | Information |
|---|---|
| 1 | Category |
| 2 | Action |
| 3 | BA Control |
| 4 | BlockAck starting Sequence Control |
| 5 | BlockAck Bitmap |

The relay ACK response frame is a frame forwarded by the relay device to the source device participating in the relay operation to report that a frame is successfully transmitted to the destination device.

Detailed operations of the source device in each operation mode and each relay mode of the relay device, and data exchange protocols and frame transmission protocols in each mode will be further described.

Figure 2:
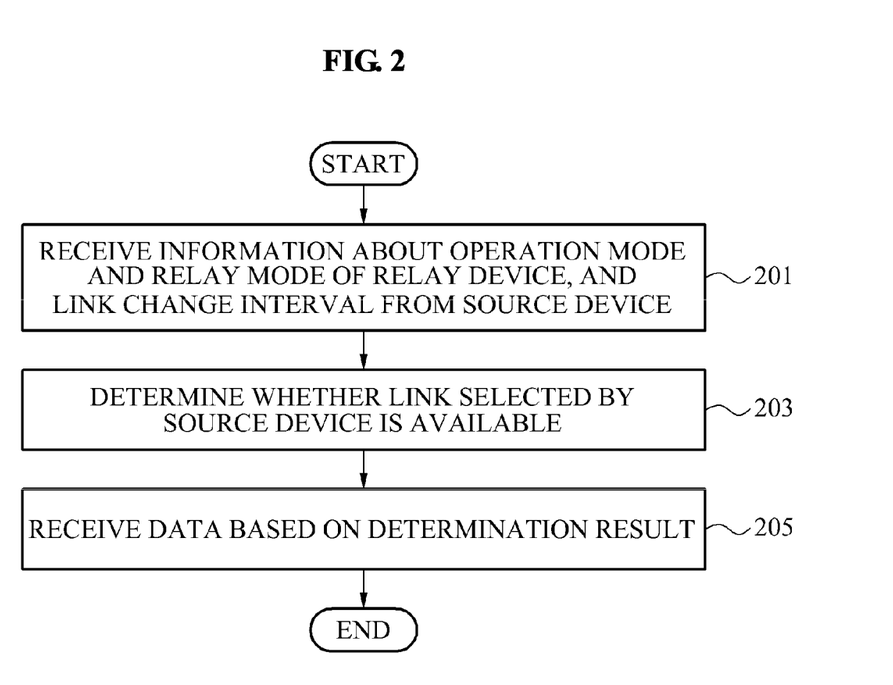
FIG. 2 is a flowchart illustrating a communication method of a destination device according to an embodiment.

FIG. 2 is a flowchart illustrating a communication method of a destination device according to an embodiment.

FIG. 2 illustrates operations of the destination device when a source device switches a link transmitting data, when the link in use to transmit the data is blocked, in a contention free period.

The destination device receives information about an operation mode used for the source device to transmit data and a relay mode of a relay device from the source device in an initialization process. Moreover, the destination device receives a preset link change interval from the source device in operation 201.

Here, the relay mode of the relay device may include at least one of the FD mode and the HD mode.

A first period and a second period used in the HD relay mode of the relay device are no longer available when a first link is a selected link.

The link change interval may start from a start point of the first period when the source device switches the second link to the first link. In addition, the FD mode, the HD mode, the first period, and the second period refer to the descriptions with reference to FIG. 1.

Further, the operation mode including at least one of the normal mode and the alternation mode also refers to the descriptions with reference to FIG. 1.

The destination device determines whether a link selected by the source device among the first link directly connected from the source device to the destination device and the second link connected from the source device to the destination device via the relay device is available in operation 203.

The destination device may determine whether the selected link is available based on whether data is received through the selected link for predetermined time.

Here, the predetermined time may be time over the data sensing time from a start of the preset link change interval.

The destination device may switch a link of the destination device from the second link to the first link at a start of each first period in order to identify whether the source device switches the second link to the first link.

When the destination device receives available data from the source device through the first link in switching the second link to the first link, the destination device may consider that the link change interval starts from the start point of the first period in which data is received through the first link.

Then, when the destination device does not receive available data from the source device through the first link, the destination device may switch the link of the destination device from the first link to the second link at a start of a next second link among a next first period and the next second period.

Here, the source device may transmit data to the relay device in the next first period, and the relay device may transmit the data to the destination device in the next second period.

The destination device receives the data based on a determination result in operation 205.

In operation 205, the destination device identifies whether the source device switches to the selected link. Then, when the source device is identified to switch to the selected link, the destination device adjusts a directional antenna of the destination device toward the selected link and stands by for receipt of the data.

When the operation mode is the normal mode and the destination device does not receive available data from the source device within the data sensing time from the start point of the preset link change interval, the destination device may switch the selected link to an unselected link.

When the operation mode is the alternation mode and data is received through the selected link, the destination device operates as follows.

When the operation mode is the alternation mode, the destination device may receive data through the selected link at the start of the preset link change interval.

The destination device may switch to the unselected link in a next link change interval to the preset link change interval. Then, the destination device may receive data from a start of the next link change interval.

When a more data field has 0 in the destination device, operations of the destination device in a relay mode of the relay device and an operation mode are as follows.

When the relay device uses the HD relay mode, the second link is selected, and a previous data frame has a more data field of 0, the destination device may not switch the link to the first link even if data is not received through a link via the relay device, which is the second link, during the second period.

When the operation mode is the normal mode and a media access control (MAC) header of a last frame received from the source device has a more data field of 0, the destination device may maintain the selected link even if data is not received through the selected link during the data sensing time.

Further, when the operation mode is the alternation mode and an MAC header of a last frame received from the source device has a more data field of 0, the destination device may maintain the selected link, instead of exchanging links in the next link change interval to the preset link change interval.

In an embodiment below, operations of the destination device on the assumption that the destination device receives data using the first link are described.

The destination device may determine whether the first link used to receive data from the source device is blocked. Here, the destination device may identify whether the source device switches the first link.

Here, when the source device is identified to switch the first link, the destination device adjusts a directional antenna of the destination device toward the second link and stands by for receipt of the data.

When the first link is determined to be blocked, the destination device switches the first link to the second link after the data sensing time based on the link change interval preset by the source device and receives the data using the second link.

When the first link is determined not to be blocked, the destination device receives the data from the source device using the same first link.

In the normal mode, when the data is not received at proper time, the destination device may switch a link from a direct link to a relay link. That is, when the operation mode is the normal mode and the destination device does not receive available data from the source device within the data sensing time from the start point of the preset link change interval, the destination device may switch the direct link to the relay link.

Further, in the alternation mode, when the destination device does not receive data in desired order, the destination device may maintain the current link instead of changing the link.

That is, when the operation mode is the alternation mode and the destination device receives data of the second link through the first link in the next link change interval to the preset link change interval, the destination device may maintain the current first link instead of switching to the second link based on the alternation mode.

Detailed operations of the destination device in each operation mode and each relay mode of the relay device, and data exchange protocols and frame transmission protocols in each mode will be further described.

Figure 3:
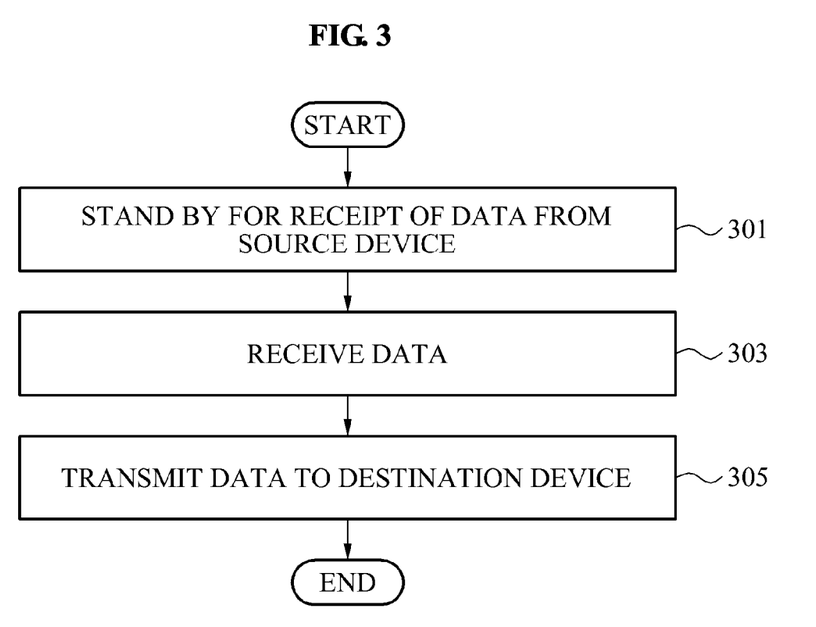
FIG. 3 is a flowchart illustrating a communication method of a relay device according to an embodiment.

FIG. 3 is a flowchart illustrating a communication method of a relay device according to an embodiment.

FIG. 3 illustrates an operation of the relay device when the source device switches a link transmitting data when the link in use to transmit data is blocked in the contention free period.

When the source device selects a second link among a first link and the second link, the relay device stands by for receipt of data from the source device at a start point of a preset link change interval in operation 301.

Here, the first link is a link directly connected from the source device to the destination device, and the second link is a link connected from the source device to the destination device via the relay device.

In operation 301, the relay device adjusts a direction of a directional antenna of the relay device for predetermined time from the start point of the preset link change interval and stands by for receipt of the data through the second link from the source device.

The relay device receives the data from the source device in operation 303 and transmits the data to the destination device in operation 305.

The relay device may receive information about a first period and a second period from the source device. Then, the relay device receives the data from the source device in the first period, and transmits the data to the destination device in the second period.

The first period is for a relay link between the source device and the relay device, and the second period is for a relay link between the relay device and the destination device.

The relay device may receive, from the source device, a request frame to identify whether the data transmitted by the source device to the relay device is transmitted to the destination device.

Then, the relay device may transmit a response frame indicating whether the data is transmitted to the destination device in response to the request frame.

The relay device may operate in at least one of the FD mode and the HD mode.

In the FD mode, the first link is switched to the second link in the preset link change interval, and the data is transmitted through the second link after the data sensing time for the destination device to detect whether the data is transmitted through the first link. In the HD mode, a transmitter transmits the data in the same manner as the FD mode when the first link is used, and the transmitter transmits the data based on the first period and the second period when the second link is used.

When the relay mode is the FD mode, the relay device adjusts a direction of another directional antenna of the relay device for predetermined time from the start point of the preset link change interval and stands by to receive the data through the link toward the destination device.

Further, when the relay mode is the FD mode, the relay device may change an operation of the directional antenna of the relay device to a transmission/reception state based on a type of each frame received by the relay device and a policy on an acknowledgement signal. Hereinafter, operations of the relay device on the assumption that the relay device transmits and receives data through the second link are described.

The relay device receives information about the first period and the second period from the source device.

The relay device receives data from the source device in the first period and transmits the data to the destination device in the second period.

The relay device may receive, from the source device, a request frame to identify whether the data transmitted by the source device to the relay device is transmitted to the destination device, described above.

In response to the request frame, the relay device may transmit a response frame indicating whether the data is transmitted to the destination device.

Here, the request frame may be a relay ACK request frame, and the response frame may be a relay ACK response frame. The respective frames refer to the descriptions in Tables 1 and 2 with reference to FIG. 1.

Hereinafter, operations for link switches between the source device, the destination device and the relay device, and data exchange protocols and frame transmission protocols of the source device, the destination device and the relay device in an allocated resource are described.

First, the source device and the destination device may have different time instances to determine whether a link is blocked when a link switch is needed due to the blockage of the link in use to transmit data. That the source device and the destination device have different time instances denotes that the respective devices may have different periods of time for beam forming to adjust transmission and reception terminals toward a new link for link switches.

Since each device has a different time instance, data transmitted by the source device through a switched link may not be received by the destination device. Thus, in an embodiment, two parameters are used, which are a link change interval and data sensing time to prevent the above-mentioned problem.

First, a switch of a link transmitting data is allowed only in a certain point of a determined period within a reserved block, thereby solving a problem due to transmission of data in a random moment.

Here, the determined period may be a link change interval, and the source device may inform the relay device and the destination device of a link change interval value before transmission of data to share information about the determined period.

When a link currently in use is detected to be blocked during transmission of data based on the preset protocols, for example, that ACK is not received, the source device may switch the link and transmit the data in a next link change interval.

However, the destination device may not recognize the link switch by the source device, since the destination device properly receives data but ACK in response to the receipt of the data is lost during transmission by the destination device to the source device, so that the source device may not recognize ACK with respect to the transmission of the data.

Thus, the source device may not immediately transmit the data in a next link change interval but transmit the data after a predetermined time, for example, a data sensing time.

The destination device is not aware of whether a link switch occurs in the next link change interval, and thus stands by in the same link before the switch. However, when data is not transmitted after the predetermined time, the destination device switches the link.

Here, in order for the source device and the destination device to synchronize with each other, the destination device switches the link after the predetermined time defined as the data sensing time, and the source device transmits the data using a switched link after time based on the data sensing time and switching time. This is because it is secure that the source device transmits time the data after time based on the switching time used for the destination device to switch the link after the data sensing time.

However, when the switching time is smaller than a propagation delay transmitted from the source device to the destination device, the switching time may be ignored. Thus, it is understood that the destination device switches the link after the data sensing time, and the source device transmits the data through the switched data after the data sensing time. Accordingly, since the destination device prepares in advance in the switched link, the destination device may properly receive the data transmitted from the source device.

In the above process, when the relay device uses the FD relay mode, the operations of the source device and the destination device are not changed.

However, when the relay device is a DF relay using the HD relay mode, the relay device decodes, then encodes and transmits data to the destination device in order to transmit the data through a relay link, and thus about double a number of slots are used as compared with in direct transmission.

Further, since the two links connected to the relay device, which are an S-R link and an R-D link, have different qualities, different periods of time may be used to transmit the same data. Thus, in the HD relay mode, there is a need for fields representing length of two blocks, which are respectively called a first period and a second period.

Values of the two fields may be set or updated through a beam forming result obtained before the source device transmits the data or link quality information requested and obtained while the data is transmitted. Further, the source device defines an information element (IE) that is a group of related parameters. The source device transmits a related parameter based on the IE to the destination device via the relay device, and the destination device may transmit corresponding information that is a related parameter to the source device via the relay device in response.

When the relay link is used, the source device transmits a packet of determined size in order to transmit a data packet to the relay device and to receive ACK after a short inter-frame space (SIFS) within the first period. If the source device transmits only one MAC service data unit (MSDU), it is proper that a value of MSDU+SIFS+ACK+SIFS is adjusted to be the same as a vale of the first period.

Likewise, the relay device may determine a size of a packet to be transmitted to the destination device in order to receive and encode the packet and to receive ACK after SIFS within the second period. If the relay device transmits only one MSDU, it is proper that a value of MSDU+SOFS+ACK+SIFS is adjusted to be the same as a value of the second period.

However, as described above, since ACK of the second period is transmitted by the relay device to the destination device, the relay device is aware of a status of the R-D link whereas the source device is not aware of a status of the R-D link.

Thus, the source device may transmit a relay ACK request frame in Table 1 to the relay device in a next first period and request information about whether a frame is properly transmitted through the R-D link. Further, the relay device may transmit a relay ACK response frame in Table 2 to the source device in response to the relay ACK request frame.

Here, formats of the relay ACK request frame and the relay ACK response frame are the same as in Tables 1 and 2, a request for BlcokAck and transmission of corresponding Block Ack.

Through the exchange of the relay ACK request frame and the relay ACK response frame, the source device may identify that the data, which is the frames, is successfully transmitted to the destination device. Further, since the source device may need to complete transmission of the data or the frames within a reserved resource, the source device leaves time for exchange of the data frame in a last first period, so that transmission of the frame is completely identified in the current reserved block.

Further, unlike the FD relay mode, in the HD relay mode, the source device may perform a different link switch operation depending on a type of a link among the direct link and the relay link.

When the direct link is used, the source device performs a link switch in each link change interval as in the FD relay mode. However, when the relay link is used, the source device operates in the first period and the second period. When the source device switches a link from the direct link to the relay link, that is, when a link change interval starts, the first period starts.

The source device transmits a data frame to the destination device based on the first period and the second period. When the source device does not receive ACK or a relay ACK response frame in the first period, the source device may determine that the relay link is blocked and switch to the direct link.

Since the source device performs a link switch to transmit data, the source device determines a link switch and then immediately switches to the direct link at a start of a next period. A link change interval starts when the source device switches to the direct link, and the source device operates using the link.

The destination device is not aware of whether the source device determines a link switch but is aware only that data or a frame to receive is not received yet. Thus, the destination device periodically identifies whether the source device performs a link switch.

When the relay link is used, time when the source device transmits a data frame is the first period, and thus the destination device stands by for a data or a frame from a direction to the direct link in each first period.

Here, stand by time of the destination device may be determined optionally by the source device.

The source device unconditionally transmits data or a frame at a start of the first period when a link switch is performed, and thus the standby time of the destination device may be set to, for example, about data sensing time.

When data or a frame is received through the direct link, the destination device may recognize that a link switch occurs and continue to use the direct link. Here, the link change interval and the data sensing time are used again.

However, when data or a frame is not received through the direct link, the destination device adjusts an antenna toward the relay device and switches to the relay link to stand by for the data or frame from a start of the second period.

Hereinafter, the data exchange protocols of the source device, the relay device, and the destination device in the allocated resource are described.

Values of the link change interval, the data sensing time, the first period, and the second period may be determined by the source device as well as the relay use mode value.

Resources that are time blocks respectively allocated to the source device and the destination device start by any one of the link change interval and the first period, and the source device, the relay device, and the destination device participating in a relay operation within one link change interval may need to use the same link.

A new link change interval starts immediately after a previous link change interval but does not exceed a range of the resources allocated to the respective devices.

In the normal mode, the source device may need to start transmission of a frame to the destination device using the direct link at a start of a first resource, which is a time block, allocated to the source device and the destination device. Then, the source device may need to use a link finally successfully used in transmission of a frame at a start of all allocated resources.

In the alternation mode, however, the source device transmits data to the destination device alternately using the direct link and the relay link. Here, the source device may need to change a link transmitting a frame in a start of each link change interval.

When ACK or BlockAck expected with respect to a frame transmitted through the direct link is not received during one link change interval, the source device may switch the link for transmission of a frame at a start of a next link change interval. Here, the source device may transmit the frame to the destination device using a relay of the relay device.

Further, when ACK or BlockAck expected with respect to a frame transmitted through the relay link is not received during one link change interval or the first period, the source device may switch the link for transmission of a frame at a start of a next link change interval or a next first period. Here, the source device may transmit the frame to the destination device using the direct link.

Figure 4:
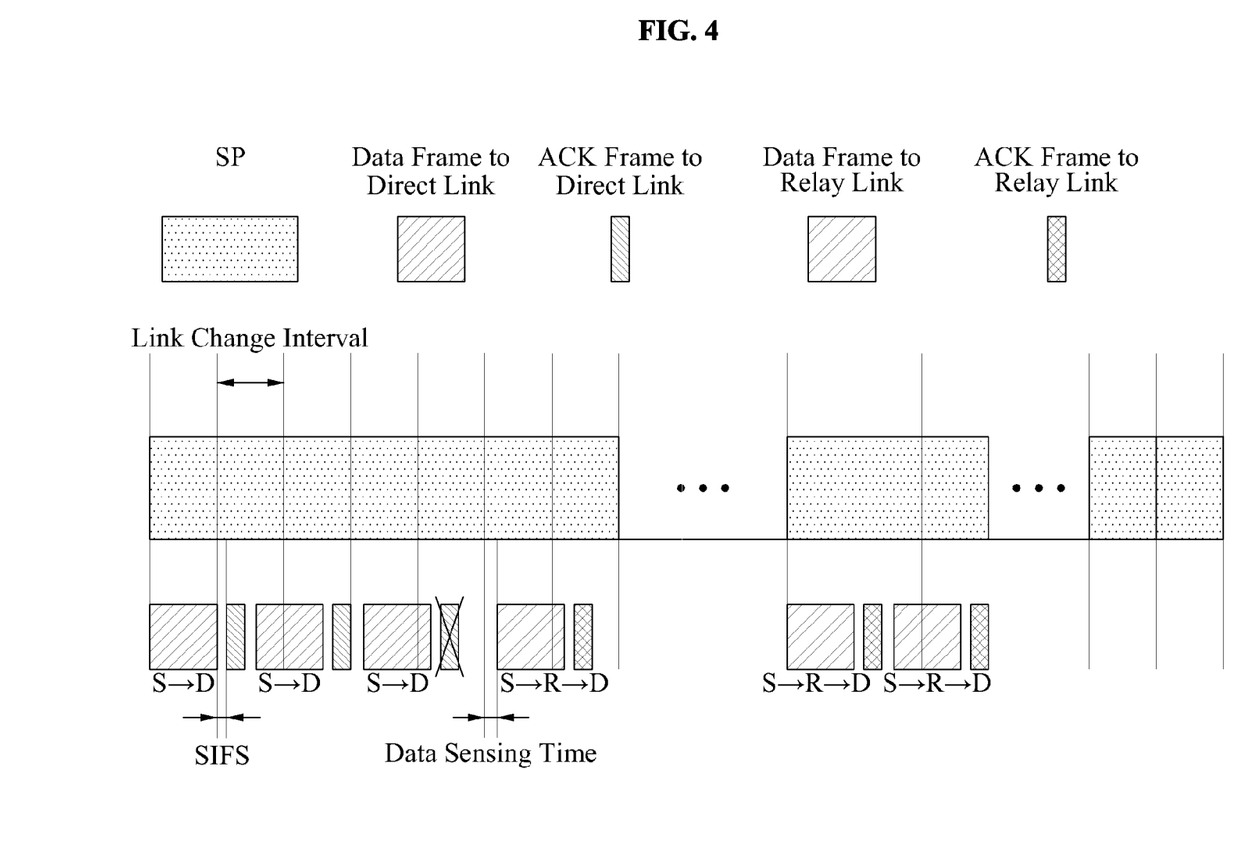
FIG. 4 illustrates a frame transmission protocol added when data is transmitted by an amplify-and-forward (AF) relay device using a full duplex (FD) relay mode according to an embodiment.

Hereinafter, in addition to the above general protocols, frame transmission protocols added for an AF relay device using the FD relay mode are described.

FIG. 4 illustrates a frame transmission protocol added when data is transmitted by the AF relay device using the FD relay mode according to an embodiment.

When the source device determines to switch a link at a start of a next link change interval and the operation mode is the normal mode, the source device may need to start transmitting a frame after data sensing time at a start of the next link change interval.

When the alternation mode is used, the source device may need to change a link used for transmission of the frame at a start of each link change interval, ignoring the data sensing time.

In the normal mode, when the destination device does not receive an available frame from the source device within the data sensing time at a start of the link change interval, the destination device may immediately switch a link to try to receive the frame from the source device through the relay device.

Figure 5:
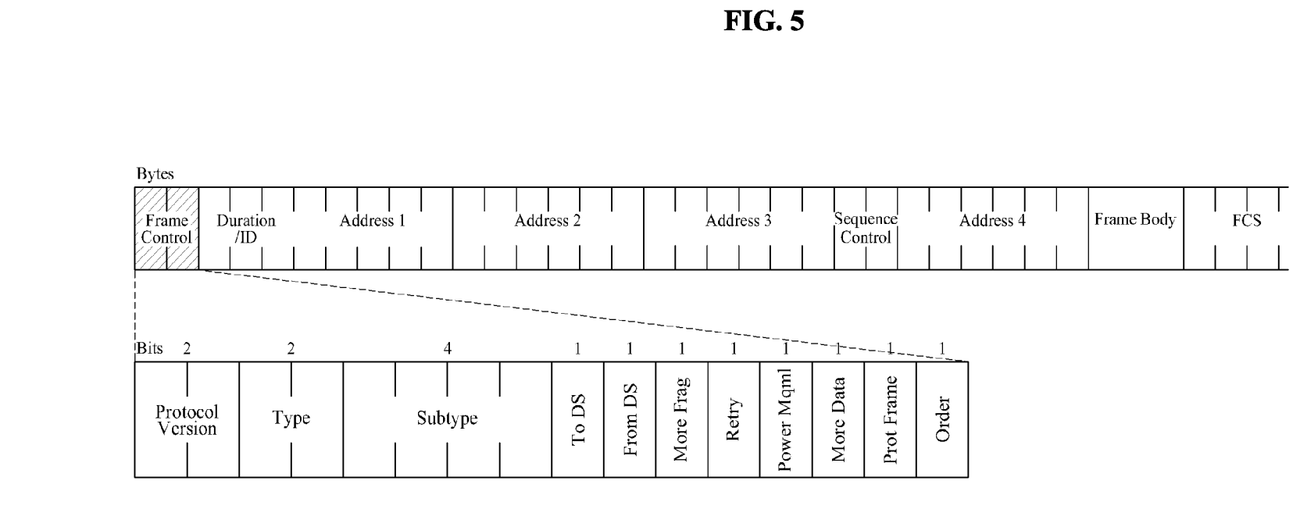
FIG. 5 illustrates a frame structure of 802.11 wireless local area network (WLAN) used in an embodiment.

When a more data field of a finally received frame is set to 0, the destination device may not switch the link in the next link change interval even if the destination device does not receive the frame during the data sensing time. Here, the more data field is described with reference to FIG. 5. FIG. 5 illustrates a frame structure of 802.11 WLAN used in an embodiment.

In the alternation mode, when data frames are not received in desired order, for example, when a frame to be received through a previous link is not received but is received through a switched link in a next link change interval, the destination device maintains the current link but does not switch the link.

When a more data field of a finally received frame is set to 0, the destination device may not switch the link at the next link change interval.

When the source device desires to use any one of the direct link and the relay link and to transmit a changed frame, the source device transmits the frame after data sensing time in a next link change interval in order to inform the destination device that the source device operates using the other link. This instance is the only example where the data sensing time is used in the alternation mode.

Figure 6:
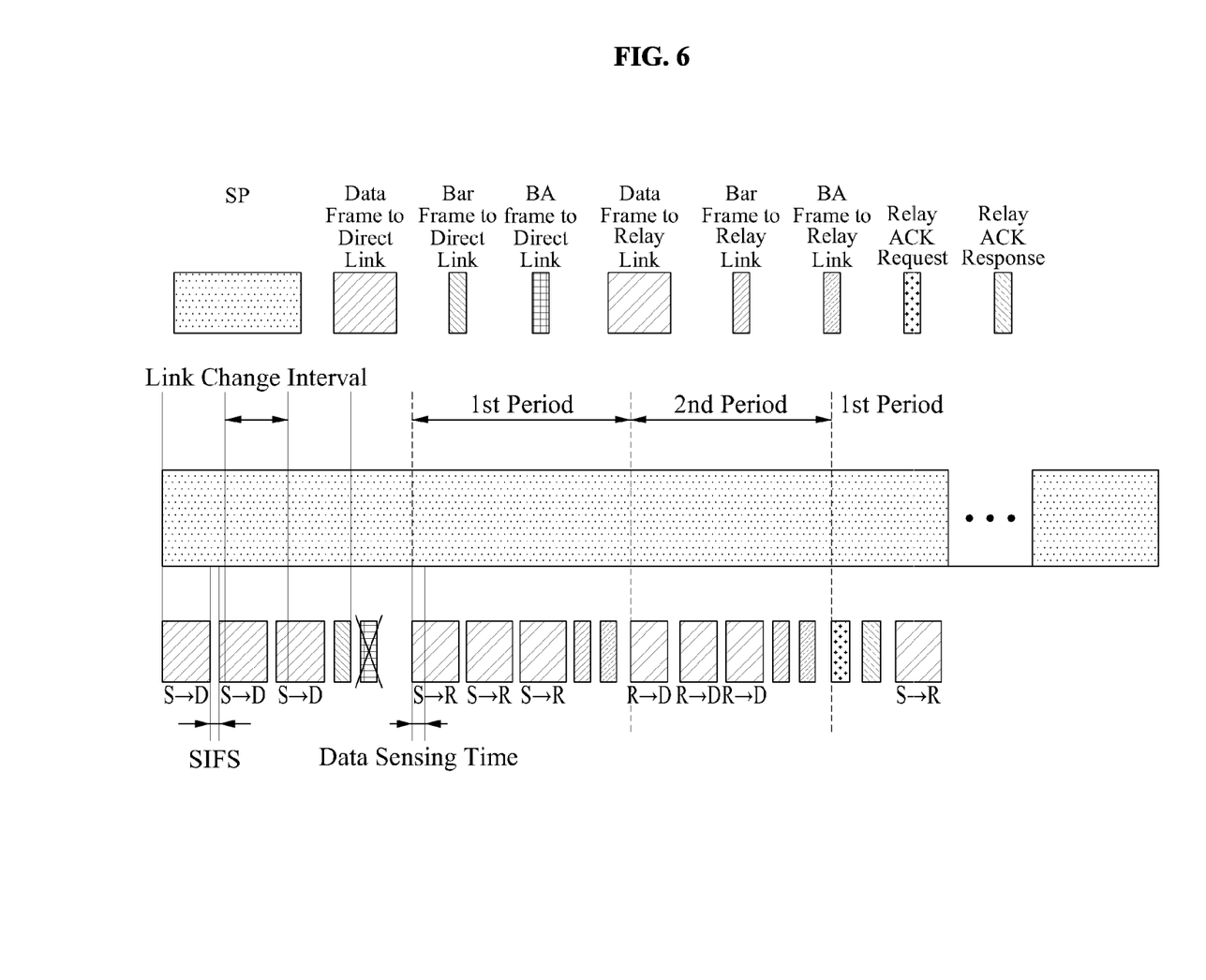
FIG. 6 illustrates a frame transmission protocol added when data is transmitted by a decode-and-forward (DF) relay device using a half duplex (HD) relay mode according to an embodiment.

Hereinafter, in addition to the above general protocols, frame transmission protocols added for a DF relay device using the HD relay mode are described.

FIG. 6 illustrates a frame transmission protocol added when data is transmitted by the DF relay device using the HD relay mode according to an embodiment.

When the relay device operates as the DF relay device using the HD relay mode and the alternation mode is used, a frame exchange is repeatedly performed for two blocks of the first period and the second period as long as the relay device is used, which means as long as the relay link is used.

In the first period, the source device transmits a frame to the relay device, and the relay device responds to the source device within SIFS if necessary. In the second period, the relay device relays the frame received from the source device to the destination device, and the destination device responds to the relay device within the SIFS if necessary. Here, a size of the first period and the second period may be the most recently transmitted value.

The first period and the second period are effective only when the source device and the destination device exchange frames via the relay device, that is, when the relay link is used. The link change interval is effective only when the source device and the destination device exchange frames through the direct link.

When the direct link is switched to the relay link, the first period starts at an end of the link change interval. Further, when the relay link is switched to the direct link, the link change interval starts at an end of the second period.

The source device may transmit a relay ACK request frame as in Table 1 to the relay device in order to identify whether all frames transmitted are successfully transmitted to the destination device via the relay device.

The relay device receiving the relay ACK request frame responds to the source device with a relay ACK response frame, and sets a BlockAck bitmap field of the relay ACK response frame in order to show which frame is successfully received.

When the source device determines to switch the direct link to the relay link at a start of a next link change interval, the source device starts transmitting a frame at the start of the next link change interval.

Assuming that the direct link is currently used and the destination device does not receive an available frame from the source device within the data sensing time at a start of each link change interval, the destination device may need to switch the link, and the first period may be considered to start at a start point of a corresponding link change interval.

When the relay link is switched to the direct link, the link change interval starts at the end of the second period, and the source device may start transmitting data or a frame using the direct link.

The destination device switches to the direct link in each first period and listens to a medium toward the source device. When the destination device receives an available frame from the source device, the destination device maintains the direct link, and the link change interval is considered to start at the start of the first period.

Otherwise, the destination device switches a link at the start of the second period and tries to receive a frame via the relay device.

When the relay link is in use and a more data field of a finally received frame from the relay device is set to 0, the destination device may not switch to the direct link even if the destination device does not receive any frame during the second frame.

Unlike the DF relay device using the HD relay mode operating in the same manner as a general device, the AF relay device using the FD relay mode operates as follows for a relay operation.

The AF relay device using the FD relay mode in an allocated resource operates in the AF mode.

Here, the AF mode means that the AF relay device using the FD relay mode amplifies a signal received with respect to each frame detected at a radio frequency (RF) in reception and simultaneously retransmits the signal via another RF in transmission within an operation resource.

The AF relay device using the FD relay mode in a start of the allocated resource initializes an RF module toward the source device to a reception state and initializes an RF module toward the destination device to a transmission state.

The AF relay device using the FD relay mode switches a state of each RF module from a transmission mode to a reception mode or vice versa based on a type of a frame and an ACK policy with respect to each received frame.

After a link switch occurs, the source device may periodically monitor quality of a previous link. To this end, the source device may use the above frame exchange protocols.

When the link before the switch is the direct link, the source device may obtain information about a status of a channel using an existing link adaptation mechanism. However, the link before the switch is the relay link, the source device uses the existing link adaptation mechanism but further needs the following process.

The following process is further transmission of information about a status of the R-D link in addition to transmission of information about a status of the S-R link, which is a conventional process, when the relay device responds to the source device with respect to a state of a channel.

When a channel status of the previous link is superior to a status of a link currently in use, the source device may switch to the previous link.

The communication method of a source device, a destination device, and a relay device according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A communication method of a source device comprising:
   detecting a status of a direct link directly connected from the source device to a destination device or a status of a relay link connected from the source device to the destination device via a relay device;
   selecting any one of the direct link and the relay link based on a result of the detection; and
   transmitting data using the selected link,
   wherein the relay device operates in a normal mode or an alternative mode,
   wherein the data is transmitted to the destination device using any one link until any one of the direct link and the relay link is determined to be unavailable, when the relay device operates in the normal mode,
   wherein the source device transmits data to the destination device alternately using the direct link and the relay link in a link change interval, when the relay device operates in the alternative mode.

2. The communication method of claim 1, wherein the selecting any one of the direct link and the relay link comprises switching any one of the direct link and the relay link to the selected link based on the result of the detection in a link change interval.

3. The communication method of claim 2, wherein the selecting any one of the direct link and the relay link includes selecting any one of the direct link and the relay link based on an acknowledgement (ACK) signal with respect to previous data transmitted to the destination device through the selected link or link quality information obtained from a frame to estimate a status of a channel.

4. The communication method of claim 3, wherein the selecting any one link includes selecting any one link based on whether one of the direct and relay links is blocked or whether quality of one of the direct and relay links corresponds to quality.

5. The communication method of claim 2, wherein the selecting any one of the direct link and the relay link includes switching the selected link to an unselected link in a next link change interval to a link change interval in which an instance that unavailability is identified occurs when the direct link or the relay link is determined to be unavailable.

6. The communication method of claim 2, wherein the switching any one of the direct link and the relay link to the selected link comprises increasing a transmission antenna gain of data through an unselected link by adjusting a direction of a directional antenna of the source device based on a result of beam forming obtained in advance through the unselected link.

7. The communication method of claim 2, further comprising informing the destination device and the relay device of parameters including the link change interval or data sensing time for the destination device to detect whether data is transmitted through the selected link.

8. The communication method of claim 2, wherein the transmitting the data using the selected link includes transmitting the data using the selected link after time based on data sensing time for the destination device to detect whether data is transmitted through the selected link or switching time used for the destination device to switch the selected link to an unselected link.

9. The communication method of claim 2, further comprising transmitting, to the destination device and the relay device, information about an operation mode and a relay mode of the relay device used to transmit the data.

10. The communication method of claim 9, wherein the relay mode of the relay device comprises at least one of a full duplex (FD) mode in which the direct link is switched to the relay link in the link change interval and the data is transmitted through the relay link after data sensing time for the destination device to detect whether the data is transmitted through the direct link, and a half duplex (HD) mode in which the relay device transmits the data in the same manner as the FD mode when the direct link is used and the relay device transmits the data based on a first period for a relay link between the source device and the relay device and a second period for a relay link between the relay device and the destination device when the relay link is used.

11. The communication method of claim 10, wherein the first period and the second period are set or updated based on at least one of a beam forming result obtained before the data is transmitted and link quality information obtained while the data is transmitted when the HD mode is used, the first period starts when the source device switches the direct link to the relay link, and the link change interval restarts when the source device switches the relay link to the direct link.

12. The communication method of claim 1, further comprising periodically switching to an unselected link in order to monitor quality of the unselected link among the direct link and the relay link.

13. The communication method of claim 12, further comprising:
transmitting, to the relay device, a request frame to monitor quality of the direct link when the direct link is switched to the relay link; and
receiving a response frame including information about the quality of the direct link in response to the request frame.

14. The communication method of claim 12, further comprising:
transmitting, to the relay device, a request frame to monitor quality of a link between the source device and the relay device of the relay link when the relay link is switched to the direct link; and
receiving, in response to the request frame, a response frame including information about the quality of the link between the source device and the relay device of the relay link and information about quality of a link between the relay device and the destination device which is received by the relay device from the destination device.

15. The communication method of claim 1, further comprising:
transmitting, to the relay device connected to the relay link, a request frame to identify whether data received by the relay device is transmitted to the destination device; and
receiving, from the relay device in response to the request frame, a response frame indicating whether the data is transmitted to the destination device.

16. A communication method of a destination device comprising:
determining whether a link selected by a source device among a direct link directly connected from the source device to the destination device and a relay link connected from the source device to the destination device via a relay device is available; and
receiving data based on a result of the determination,
wherein the relay device operates in a normal mode or an alternative mode,
wherein the data is transmitted to the destination device using any one link until any one of the direct link and the relay link is determined to be unavailable, when the relay device operates in the normal mode,
wherein the source device transmits data to the destination device alternately using the direct link and the relay link in a link change interval, when the relay device operates in the alternative mode.

17. The communication method of claim 16, wherein the determining whether the link selected by the source device is available determines whether the selected link is available based on whether the data is received through the selected link over a data sensing time from a start of a link change interval.

18. A communication method of a relay device comprising:
standing by for receipt of data from a source device at a start point of a link change interval when the source device selects a relay link connected from the source device to a destination device, the relay link being connected from the source device to the destination device via a relay device; and transmitting the data to the destination device, wherein the relay device operates in a normal mode or an alternative mode, wherein the data is transmitted to the destination device using any one link until any one of a direct link and the relay link is determined to be unavailable, when the relay device operates in the normal mode, wherein the source device transmits data to the destination device alternately using the direct link and the relay link in a link change interval, when the relay device operates in the alternative mode.

19. The communication method of claim 18, wherein the standing by for the receipt of data from the source device stands by for the receipt of data from the source device through the relay link by adjusting a direction of a directional antenna of the relay device for predetermined time from the start point of the link change interval.

* * * * *